(12) United States Patent
Imaji et al.

(10) Patent No.: US 9,812,711 B2
(45) Date of Patent: Nov. 7, 2017

(54) CARBONACEOUS MATERIAL FOR NON-AQUEOUS ELECTROLYTE SECONDARY BATTERY ANODE, NON-AQUEOUS ELECTROLYTE SECONDARY BATTERY ANODE, NON-AQUEOUS ELECTROLYTE SECONDARY BATTERY, AND VEHICLE

(71) Applicant: Kureha Corporation, Tokyo (JP)

(72) Inventors: Makoto Imaji, Tokyo (JP); Kayoko Okada, Tokyo (JP); Yasuhiro Tada, Tokyo (JP); Naohiro Sonobe, Tokyo (JP); Mayu Komatsu, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/300,312

(22) PCT Filed: Mar. 27, 2015

(86) PCT No.: PCT/JP2015/059770
§ 371 (c)(1),
(2) Date: Sep. 29, 2016

(87) PCT Pub. No.: WO2015/152090
PCT Pub. Date: Oct. 8, 2015

(65) Prior Publication Data
US 2017/0149062 A1    May 25, 2017

(30) Foreign Application Priority Data

Mar. 31, 2014 (JP) ................................. 2014-074974

(51) Int. Cl.
| | | |
|---|---|---|
| H01M 4/587 | (2010.01) | |
| H01M 10/0525 | (2010.01) | |
| C01B 31/02 | (2006.01) | |
| H01M 4/02 | (2006.01) | |

(52) U.S. Cl.
CPC ............ *H01M 4/587* (2013.01); *C01B 31/02* (2013.01); *H01M 10/0525* (2013.01); *C01P 2002/76* (2013.01); *C01P 2004/61* (2013.01); *C01P 2004/62* (2013.01); *C01P 2006/40* (2013.01); *H01M 2004/021* (2013.01); *H01M 2004/027* (2013.01); *H01M 2220/20* (2013.01)

(58) Field of Classification Search
CPC .. H01M 4/133; H01M 4/583; H01M 10/0525; H01M 10/052; H01M 2004/021; H01M 2004/027
See application file for complete search history.

(56) References Cited

U.S. PATENT DOCUMENTS

| 8,574,533 B2 | 11/2013 | Sonobe et al. |
| 2002/0164529 A1 | 11/2002 | Che et al. |
| 2009/0060826 A1 | 3/2009 | Ohashi et al. |
| 2009/0140214 A1* | 6/2009 | Sonobe .................. C01B 31/02 252/511 |
| 2009/0297953 A1 | 12/2009 | Shimizu et al. |
| 2011/0189078 A1 | 8/2011 | Ohashi et al. |
| 2014/0127561 A1* | 5/2014 | Yamami ................ H01M 4/133 429/188 |
| 2015/0024277 A1 | 1/2015 | Komatsu et al. |
| 2015/0263347 A1 | 9/2015 | Imaji et al. |

FOREIGN PATENT DOCUMENTS

| CN | 1938884 A | 3/2007 |
| EP | 0 817 295 A2 | 1/1998 |
| EP | 2 894 702 A1 | 7/2015 |
| JP | 8-31420 A | 2/1996 |
| JP | 2002334693 A | 11/2002 |
| JP | 2014035924 A | 2/2014 |
| TW | 201338253 A | 9/2013 |
| WO | 2005098998 A1 | 10/2005 |
| WO | 2007040007 A1 | 4/2007 |
| WO | 2007094114 A1 | 8/2007 |
| WO | 2013118757 A1 | 8/2013 |

(Continued)

OTHER PUBLICATIONS

Office Action dated Jan. 22, 2016, in Taiwan Patent Application No. 104110536, with English translation.
International Search Report of PCT/JP2015/059770 dated May 19, 2015.
Japanese Notification of Reasons for Rejection, dated Jun. 13, 2017, for Japanese Application No. 2016-511846, with an English translation.

(Continued)

*Primary Examiner* — Brittany Raymond
(74) *Attorney, Agent, or Firm* — Birch, Stewart, Kolasch & Birch, LLP

(57) ABSTRACT

To provide a carbonaceous material for a non-aqueous electrolyte secondary battery anode that yields an anode for a non-aqueous electrolyte secondary battery having excellent input/output characteristics, and a non-aqueous electrolyte secondary battery having high discharge capacity per unit volume, and a non-aqueous electrolyte secondary battery and a vehicle comprising this non-aqueous electrolyte secondary battery anode.

The carbonaceous material for a non-aqueous electrolyte secondary battery anode of the present invention has a number average particle size of from 0.1 to 2.0 μm, a value of a number average particle size divided by a volume average particle size of not greater than 0.3, an average interlayer spacing $d_{002}$ of an (002) plane determined by X-ray diffraction of from 0.340 to 0.390 nm, and an atomic ratio (H/C) of hydrogen and carbon of not greater than 0.10.

9 Claims, No Drawings

(56) References Cited

FOREIGN PATENT DOCUMENTS

| WO | 2014034857 A1 | 3/2014 |
| WO | WO 2014/038491 A1 | 3/2014 |

OTHER PUBLICATIONS

Extended European Search Report dated Apr. 13, 2017, in European Patent Application No. 15773970.7.

* cited by examiner

CARBONACEOUS MATERIAL FOR NON-AQUEOUS ELECTROLYTE SECONDARY BATTERY ANODE, NON-AQUEOUS ELECTROLYTE SECONDARY BATTERY ANODE, NON-AQUEOUS ELECTROLYTE SECONDARY BATTERY, AND VEHICLE

TECHNICAL FIELD

The present invention relates to a carbonaceous material for a non-aqueous electrolyte secondary battery anode, a non-aqueous electrolyte secondary battery anode, a non-aqueous electrolyte secondary battery, and a vehicle.

BACKGROUND ART

In recent years, the notion of mounting large lithium-ion secondary batteries, having high energy density and excellent output energy characteristics, in electric vehicles has been investigated in response to increasing concern over environmental issues. In small mobile device applications such as mobile telephones or laptop computers, the capacity per unit volume is important, and therefore graphitic materials with a large density have primarily been used as active material for anodes. However, lithium-ion secondary batteries for automobiles are difficult to replace at an intermediate stage due to their large size and high cost. For this reason, lithium-ion secondary batteries for vehicles are required to have the same durability as that of vehicles, for example, a product life of 10 years or longer (high durability). Furthermore, with regard to usage conditions of secondary batteries, the charging time is, for example, 1 to 2 hours in a small portable device, whereas for a power supply for a hybrid vehicle, it is several tens of seconds considering that energy is recycled during braking. Discharging time is also several tens of seconds considering the time for which a driver steps on the accelerator, and much faster charge/discharge characteristics are required compared to a lithium-ion secondary battery for portable devices.

Conventionally, a carbonaceous material obtained by carbonizing an organic material or a vegetable raw material has been effectively used as the anode of a lithium-ion secondary battery, but excellent charge/discharge characteristics are required in the carbonaceous material for anodes used in a vehicle-mounted lithium-ion secondary battery as described above, and improvement of input/output characteristics is indispensable for realizing such a battery.

Up to now, ensuring the presence of voids in the anode active material in an anode of a non-aqueous electrolyte secondary battery has been examined in order to improve input/output characteristics. For example, as methods for ensuring the presence of voids in the anode active material, improvement of output characteristics and charge/discharge performance by using a spherical non-graphitizable carbonaceous material in the anode (Patent Document 1) and improving input/output characteristics by setting the electrode density to an appropriate value (Patent Document 2) have been described, but input/output characteristics were not sufficient. Furthermore, to ensure the presence of inter-particle voids of the active material, a carbonaceous material in which particle shape and particle size distribution are adjusted has been proposed (Patent Document 3).

CITATION LIST

Patent Literature

Patent Document 1: International Patent Application WO/2005/098998

Patent Document 2: Japanese Unexamined Patent Application Publication No. 2002-334693A Patent Document 3: International Patent Application WO/2013/118757

SUMMARY OF INVENTION

Technical Problem

However, in lithium-ion secondary batteries for vehicles, further improvement of input/output characteristics including increased discharge capacity per unit volume is required to extend the cruising range on a single charge and to improve vehicle fuel consumption. Furthermore, sustaining high input characteristics even in low-temperature environments is demanded, considering that vehicles are used in cold climates.

An object of the present invention is to provide a carbonaceous material for a non-aqueous electrolyte secondary battery anode that yields an anode for a non-aqueous electrolyte secondary battery having excellent input/output characteristics, and a non-aqueous electrolyte secondary battery having high discharge capacity per unit volume, and a non-aqueous electrolyte secondary battery and a vehicle comprising this non-aqueous electrolyte secondary battery anode.

Solution to Problem

The present inventors discovered that input/output characteristics can be improved when a broad particle size distribution, in which the value of the number average particle size divided by the volume average particle size is not greater than 0.3, is used in carbonaceous material rich in small-diameter powder, of which the number average particle size is from 0.1 to 2.0 μm, and thereby achieved the present invention. Specifically, the present invention provides the following.

(1) A carbonaceous material for a non-aqueous electrolyte secondary battery anode, a number average particle size being from 0.1 to 2.0 μm, a value of a number average particle size divided by a volume average particle size being not greater than 0.3, an average interlayer spacing $d_{002}$ of an (002) plane determined by X-ray diffraction being from 0.340 to 0.390 nm, and an atomic ratio (H/C) of hydrogen and carbon being not greater than 0.10.

(2) The carbonaceous material for a non-aqueous electrolyte secondary battery anode according to the above (1), wherein a volume average particle size $D_{v50}$ is from 1 to 7 μm.

(3) The carbonaceous material for a non-aqueous electrolyte secondary battery anode according to the above (1) or (2), wherein a cumulative volume particle size $D_{v10}$ is not greater than 2.5 μm.

(4) The carbonaceous material for a non-aqueous electrolyte secondary battery anode according to any one of the above (1) to (3), wherein a quantity of particles having a volume average particle size of not less than 30 μm is not greater than 1.0 vol %.

(5) A non-aqueous electrolyte secondary battery anode comprising the carbonaceous material for a non-aqueous electrolyte secondary battery anode described in any one of the above (1) to (4).

(6) The non-aqueous electrolyte secondary battery anode according to the above (5), wherein an electrode density when press pressure of 13 MPa (2.5 tf/cm$^2$) is applied is not less than 1.02 g/cm$^3$.

(7) The non-aqueous electrolyte secondary battery anode according to the above (5) or (6), wherein an average thickness is not greater than 60 μm.

(8) A non-aqueous electrolyte secondary battery comprising the non-aqueous electrolyte secondary battery anode described in any one of the above (5) to (7).

(9) A vehicle in which the non-aqueous electrolyte secondary battery described in the above (8) is mounted.

Advantageous Effects of Invention

According to the present invention, an anode having excellent input/output characteristics is provided by using a carbonaceous material that has a number average particle size of from 0.1 to 2.0 μm, a value of a number average particle size divided by a volume average particle size of not greater than 0.3, an average interlayer spacing $d_{002}$ of an (002) plane determined by X-ray diffraction of from 0.340 to 0.390 nm, and an atomic ratio (H/C) of hydrogen and carbon of not greater than 0.10. An anode having a high discharge capacity per unit volume of which the input characteristics are good particularly in low-temperature environments is obtained.

DESCRIPTION OF EMBODIMENTS

Hereinafter, embodiments of the present invention will be described.

[1] Carbonaceous material for non-aqueous electrolyte secondary battery anodes The carbonaceous material for a non-aqueous electrolyte secondary battery anode of the present invention is characterized in that the number average particle size is from 0.1 to 2.0 μm, the value of the number average particle size divided by the volume average particle size is not greater than 0.3, the average interlayer spacing $d_{002}$ of the (002) plane determined by X-ray diffraction is from 0.340 to 0.390 nm, and the atomic ratio (H/C) of hydrogen and carbon is not greater than 0.10.

A carbonaceous material of which the number average particle size is from 0.1 to 2.0 μm and the value of the number average particle size divided by the volume average particle size is not greater than 0.3 is rich in particles of small particle size and has a broad particle size distribution. Such a carbonaceous material readily produces an anode having a high amount of active material per unit volume and a high charge/discharge capacity per unit volume because it can be densely packed.

The average interlayer spacing of the (002) plane of a carbonaceous material indicates a value that decreases as the crystal integrity increases. The spacing of an ideal graphite structure yields a value of 0.3354 nm, and the value tends to increase as the structure is disordered. Therefore, the average interlayer spacing is effective as an index indicating the carbon structure. In the present invention, the average interlayer spacing $d_{002}$ of the (002) plane determined by X-ray diffraction is from 0.340 to 0.390 nm. A carbonaceous material that develops a graphite structure having $d_{002}$ of less than 0.340 nm is not preferred because in a secondary battery that uses such a carbonaceous material as an anode material, disintegration of the carbonaceous material and decomposition of the electrolyte due to active material doping and de-doping readily occur and the charge/discharge cycle characteristics of the battery are inferior. Furthermore, a carbonaceous material having $d_{002}$ greater than 0.390 nm has high irreversible capacity of the active material such as lithium, and the utilization rate of the active material decreases. From this perspective, $d_{002}$ is preferably from 0.340 to 0.390 nm. The lower limit is more preferably 0.345 nm, and even more preferably 0.350 nm. The upper limit is preferably not greater than 0.385 nm.

Carbonaceous material having $d_{002}$ of not less than 0.365 nm (especially not less than 0.370 nm) and not greater than 0.390 nm is called hard carbon (non-graphitizable carbon), and carbonaceous material having $d_{002}$ of 0.345 nm to 0.370 nm (especially from 0.345 to 0.365 nm) is called soft carbon (graphitizable carbon). The carbonaceous material of the present invention can be any carbonaceous material, and due to having the particle size distribution described above, it can be densely packed.

The H/C ratio of the carbonaceous material of the present invention was determined by measuring hydrogen atoms and carbon atoms by elemental analysis. Since the hydrogen content of the carbonaceous material decreases as the degree of carbonization increases, the H/C ratio tends to decrease. Therefore, the H/C ratio is effective as an index expressing the degree of carbonization. Although the H/C ratio of the carbonaceous material of the present invention is not limited, the H/C ratio is not greater than 0.10 and more preferably not greater than 0.08. The H/C ratio is particularly preferably 0.05 or less. When the H/C ratio of hydrogen atoms to carbon atoms exceeds 0.1, the amount of functional groups present in the carbonaceous material increases, and the irreversible capacity can increase due to a reaction with lithium. Therefore, this is not preferable.

In the present invention, when the volume average particle size ($D_{v50}$) of the carbonaceous material is too small, the amount of ultrafine powder having high reactivity with the electrolyte increases and irreversible capacity tends to increase. Therefore, $D_{v50}$ is preferably not less than 1 μm and more preferably not less than 2 μm. On the other hand, when $D_{v50}$ is too large, there tends to be insufficient powder of small particle size which contributes to the improvement of input/output characteristics described above. Therefore, $D_{v50}$ is preferably not greater than 7 μm and more preferably not greater than 6 μm.

The cumulative volume particle size $D_{v10}$ of the carbonaceous material well reflects the frequency of powder of small particle size. As described above, in the present invention, because carbonaceous powder of small particle size contributes to improvement of input/output characteristics, $D_{v10}$ is preferably not greater than 2.5 μm and more preferably not greater than 2.0 μm from the perspective of containing a sufficient amount of such carbonaceous powder of small particle size.

In the present invention, while the fact that the carbonaceous material can be densely packed is one reason for improvement in input/output characteristics, when the cumulative volume particle size $D_{v90}$ is too large, the amount of carbonaceous powder of small particle size contributing to improvement of input/output characteristics tends to be insufficient. Therefore, $D_{v90}$ is preferably not greater than 16 μm and more preferably not greater than 14 μm.

The value of $(D_{v90}-D_{v10})/D_{v50}$ can be used as an index of particle size distribution, and the value of $(D_{v90}-D_{v10})/D_{v50}$ of the carbonaceous material for a non-aqueous electrolyte secondary battery anode of the present invention is preferably not less than 1.4 and more preferably not less than 1.6 from the perspective of yielding a broad particle size distribution. However, since excessive labor for pulverization and classification is required to achieve a broad particle size distribution, the upper limit is of $(D_{v90}-D_{v10})/D_{v50}$ is preferably not greater than 3.

In the present invention, it is effective to reduce the thickness of the active material layer of the anode to improve input/output characteristics, although it is not particularly limited. The carbonaceous material described above can be densely packed, but when this is done, the voids formed between the anode carbonaceous material powder are small and movement of lithium in the electrolyte is inhibited, which affects output characteristics. However, when the anode active material layer is thin, the lithium ion diffusion path becomes short, and as a result, the advantage of the increase in capacity per unit volume outweighs the disadvantage that movement of lithium is inhibited by dense packing. From the perspective of forming such a thin, smooth active material layer, it preferably does not contain a large amount of particles of large particle size. Specifically, the amount of particles having a volume particle size of not less than 30 μm is preferably not greater than 1.0 vol %, more preferably not greater than 0.5 vol %, and most preferably 0 vol %. The particle size distribution can be adjusted by classification after pulverization in the manufacturing process.

The true density ($\rho_{Bt}$) determined by the pycnometer method using butanol should be not less than 1.52 g/cm$^3$ and less than 2.10 g/cm$^3$. When the carbonaceous material of the present invention has such a high true density, it can exhibit an even higher capacity per unit volume. Specifically, $\rho_{Bt}$ should be not less than 1.52 g/cm$^3$ and not greater than 1.75 g/cm$^3$, or not less than 1.70 g/cm$^3$ and less than 2.10 g/cm$^3$.

When the specific surface area (SSA) determined by the BET method of nitrogen adsorption of the carbonaceous material of the present invention is too high, the irreversible capacity of the resulting battery tends to be high, and therefore it should be not greater than 25 m$^2$/g and preferably not greater than 20 m$^2$/g. On the other hand, when the BET specific surface area is too low, the discharge capacity of the battery tends to be low, and therefore it is not less than 1 m$^2$/g, preferably not less than 3 m$^2$/g, and more preferably not less than 6 m$^2$/g.

The carbonaceous material for a non-aqueous electrolyte secondary battery anode of the present invention is not particularly limited, but may be satisfactorily manufactured by controlling the pulverization conditions and the like while using a manufacturing method similar to that of conventional carbonaceous materials for non-aqueous electrolyte secondary battery anodes as a basis. Specifically, the manufacturing method is as follows.

Carbon Precursor

The carbonaceous material of the present invention is produced from a carbon precursor. Examples of carbon precursors include petroleum pitch or tar, coal pitch or tar, thermoplastic resins, and thermosetting resins. In addition, examples of thermoplastic resins include polyacetals, polyacrylonitriles, styrene/divinylbenzene copolymers, polyimides, polycarbonates, modified polyphenylene ethers, polybutylene terephthalates, polyarylates, polysulfones, polyphenylene sulfides, fluorine resins, polyamide imides, and polyether ether ketones. Furthermore, examples of thermosetting resins include phenol resins, amino resins, unsaturated polyester resins, diallyl phthalate resins, alkyd resins, epoxy resins, and urethane resins. In this specification, a "carbon precursor" refers to a carbon material from the stage of an untreated carbon material to the preliminary stage of the carbonaceous material for a non-aqueous electrolyte secondary battery that is ultimately obtained. That is, a "carbon precursor" refers to all carbon materials for which the final step has not been completed.

Crosslinking Treatment

Crosslinking treatment is performed when a petroleum pitch or tar, coal pitch or tar, or thermoplastic resin is used as a carbon precursor. The method used for crosslinking treatment is not particularly limited, but crosslinking treatment may be performed using an oxidizer, for example. The oxidizer is also not particularly limited, but an oxidizing gas such as $O_2$, $O_3$, $SO_3$, $NO_2$, a mixed gas in which these are diluted with air, nitrogen, or the like, or air may be used as a gas. In addition, an oxidizing liquid such as sulfuric acid, nitric acid, or hydrogen peroxide or a mixture thereof can be used as a liquid. The oxidation temperature is also not particularly limited but is preferably from 120 to 400° C. and more preferably from 150 to 350° C. When the temperature is lower than 120° C., the crosslinking reaction does not proceed sufficiently and the reaction ends up taking a long time. When the temperature is higher than 400° C., decomposition reactions become more prominent than crosslinking reactions, and the yield of the resulting carbon material becomes low.

Firing is the process of transforming a carbon precursor into a carbonaceous material for a non-aqueous electrolyte secondary battery anode. When performing pre-firing and final firing, the carbon precursor may be pulverized and subjected to final firing after the temperature is reduced after pre-firing. The pulverization step may be performed after crosslinking treatment but is preferably performed after pre-firing.

The carbonaceous material of the present invention is manufactured by a step of pulverizing a carbon precursor and a step of firing the carbon precursor.

Pre-Firing Step

The pre-firing step in the present invention is performed by firing a carbon source at not lower than 300° C. and lower than 900° C. Pre-firing removes volatile matter such as $CO_2$, CO, $CH_4$, and $H_2$, for example, and the tar content so that the generation of these components can be reduced and the burden of the firing vessel can be reduced in final firing. When the pre-firing temperature is lower than 300° C., de-tarring becomes insufficient, and the amount of tar or gas generated in the final firing step after milling becomes large. This may adhere to the particle surface and cause a decrease in battery performance without being able to maintain the surface properties after milling, which is not preferable. The pre-firing temperature is preferably not lower than 300° C., more preferably not lower than 500° C., and particularly preferably not lower than 600° C. On the other hand, when the pre-firing treatment temperature is 900° C. or higher, the temperature exceeds the tar-generating temperature range, and the used energy efficiency decreases, which is not preferable. Furthermore, the generated tar causes a secondary decomposition reaction, and the tar adheres to the carbon precursor and causes a decrease in performance, which is not preferable. When the pre-firing temperature is too high, carbonization progresses and the particles of the carbon precursor become too hard. As a result, when pulverization is performed after pre-firing, pulverization may be difficult due to the chipping away of the interior of the pulverizer, which is not preferable.

The pre-firing is performed in an inert gas atmosphere, and examples of the inert gas include nitrogen, argon, and the like. In addition, pre-firing can be performed under reduced pressure at a pressure of 10 kPa or lower, for example. The pre-firing time is not particularly limited, but pre-firing may be performed for 0.5 to 10 hours, for example, and is preferably performed for 1 to 5 hours.

In pre-firing of a carbon precursor having a butanol true density of 1.55 to 1.75 g/cm$^3$, a large amount of tar components are produced, and when the temperature is raised rapidly, foaming of the particles occurs and the tar serves as a binder, so that the particles end up fusing to each other. For this reason, when pre-firing a carbon precursor to result in a butanol true density of 1.55 to 1.75 g/cm$^3$, it is desirable that the heating rate of pre-firing be gentle. For example, the heating rate is preferably not less than 5° C./h and not greater than 300° C./h, more preferably not less than 10° C./h and not greater than 200° C./h, and even more preferably not less than 20° C./h and not greater than 100° C./h.

Pulverization Step

The pulverization step is performed in order to make the particle size of the carbon precursor uniform. Pulverization can be performed after carbonization by final firing. When the carbonization reaction progresses, the carbon precursor becomes hard and the particle size distribution is difficult to control by means of pulverization, and therefore the pulverization step is preferably performed after pre-firing and prior to final firing.

The mill used in pulverization is not particularly limited, and a jet mill, a ball mill, a hammer mill, a rod mill, or the like, for example, can be used.

Examples of classification include classification with a sieve, wet classification, and dry classification. An example of a wet classifier is a classifier utilizing a principle such as gravitational classification, inertial classification, hydraulic classification, or centrifugal classification. An example of a dry classifier is a classifier utilizing a principle such as sedimentation classification, mechanical classification, or centrifugal classification.

In the milling step, milling and classification can be performed with a single apparatus. For example, milling and classification can be performed using a jet mill equipped with a dry classification function.

Furthermore, an apparatus with an independent miller and classifier can also be used. In this case, milling and classification can be performed continuously, but milling and classification may also be performed non-continuously.

Final Firing Step

The final firing step in the present invention can be performed in accordance with an ordinary final firing procedure, and a carbonaceous material for a non-aqueous electrolyte secondary battery anode can be obtained by performing final firing. The final firing temperature is from 900 to 1600° C. If the firing temperature is lower than 900° C., a large amount of functional groups remain in the carbonaceous material, the value of H/C increases, and the irreversible capacity also increases due to a reaction with lithium. Therefore, it is not preferable. The lower limit of the firing temperature in the present invention is not lower than 900° C., more preferably not lower than 1000° C., and particularly preferably not lower than 1100° C. On the other hand, when the final firing temperature exceeds 1600° C., the selective orientation of the carbon hexagonal plane increases, and the discharge capacity decreases, which is not preferable. The upper limit of the final firing temperature in the present invention is 1600° C. or lower, more preferably 1500° C. or lower, and particularly preferably 1450° C. or lower.

Final firing is preferably performed in a non-oxidizing gas atmosphere. Examples of non-oxidizing gases include helium, nitrogen, and argon, and the like, and these may be used alone or as a mixture. Final firing may also be performed in a gas atmosphere in which a halogen gas such as chlorine is mixed with the non-oxidizing gas described above. In addition, final firing can be performed under reduced pressure at a pressure of 10 kPa or lower, for example. The final firing time is not particularly limited, but final firing can be performed for 0.1 to 10 hours, for example, and is preferably performed for 0.2 to 8 hours, and more preferably for 0.4 to 6 hours.

Production of Carbonaceous Material from Tar or Pitch

Examples of the production method for the carbonaceous material of the present invention from tar or pitch will be described below.

First, crosslinking treatment (infusibilization) was performed on tar or pitch. The tar or pitch that has undergone crosslinking treatment is carbonized by subsequent firing, to result in a structure-controlled carbonaceous material.

Examples of tar or pitch that can be used include petroleum or coal tar or pitch such as petroleum tar or pitch produced as a by-product at the time of ethylene production, coal tar produced at the time of coal carbonization, heavy components or pitch from which the low-boiling-point components of coal tar are distilled out, or tar or pitch obtained by coal liquefaction. Two or more of these types of tar and pitch may also be mixed together.

Specific methods of crosslinking treatment include a method of using a crosslinking agent and a method of treating the material with an oxidizer such as air. When a crosslinking agent is used, a carbon precursor is obtained by adding a crosslinking agent to the petroleum tar or pitch or coal tar or pitch and mixing the substances while heating so as to promote crosslinking reactions. For example, a polyfunctional vinyl monomer with which crosslinking reactions are promoted by radical reactions such as divinylbenzene, trivinylbenzene, diallyl phthalate, ethylene glycol dimethacrylate, or N,N-methylene bis-acrylamide may be used as a crosslinking agent. Crosslinking reactions with the polyfunctional vinyl monomer are initiated by adding a radical initiator. Here, α,α'-azobis-isobutyronitrile (AIBN), benzoyl peroxide (BPO), lauroyl peroxide, cumene hydroperoxide, 1-butyl hydroperoxide, hydrogen peroxide, or the like can be used as a radical initiator.

In addition, when promoting crosslinking reactions by treating the material with an oxidizer such as air, it is preferable to obtain the carbon precursor with the following method. Specifically, after a 2- or 3-ring aromatic compound with a boiling point of at least 200° C. or a mixture thereof is added to a petroleum pitch or coal pitch as an additive and mixed while stirring, the mixture is molded to obtain a pitch compact. Next, after the additive is extracted from the pitch compact with a solvent having low solubility with respect to the pitch and having high solubility with respect to the additive so as to form a porous pitch, the mixture is oxidized using an oxidizer to obtain a carbon precursor. The purpose of the aromatic additive described above is to make the compact porous by extracting the additive from the pitch compact after molding so as to facilitate crosslinking treatment by means of oxidation and to make the carbonaceous material obtained after carbonization porous. The additive described above may be selected, for example, from one type of naphthalene, methyl naphthalene, phenyl naphthalene, benzyl naphthalene, methyl anthracene, phenanthrene, or biphenyl or a mixture of two or more types thereof. The amount of the aromatic additive added to the pitch is preferably in a range of 30 to 70 parts by mass per 100 parts by mass of the pitch.

To achieve a homogeneous mixture of the pitch and the additive, they are mixed in the molten state while heating. This is preferably performed after the mixture of the pitch and the additive is molded into particles with a particle size of at most 1 mm so that the additive can be easily extracted from the mixture. Molding may be performed in the melted state and may be performed with a method such as cooling and then pulverizing the mixture. Suitable examples of solvents for extracting and removing the additive from the mixture of the pitch and the additive include aliphatic hydrocarbons such as butane, pentane, hexane, or heptane, mixtures of aliphatic hydrocarbon primary constituents such as naphtha or kerosene, and aliphatic alcohols such as methanol, ethanol, propanol, or butanol. By extracting the additive from the compact of the mixture of pitch and additive using such a solvent, the additive can be removed from the compact while the spherical shape of the compact is maintained. It is surmised that holes are formed by the additive in the compact at this time, and a pitch compact having uniform porosity can be obtained.

In order to crosslink the obtained porous pitch, it is then preferably oxidized using an oxidizer at a temperature of 120 to 400° C. Here, an oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer. It is convenient and economically advantageous to perform crosslinking treatment by oxidizing the material at 120 to 400° C. using a gas containing oxygen such as air or a mixed gas of air and another gas such as a combustible gas, for example, as an oxidizer. In this case, when the softening point of the pitch is low, the pitch melts at the time of oxidation, which makes oxidation difficult, so the pitch that is used preferably has a softening point of at least 150° C.

After the carbon precursor subjected to crosslinking treatment as described above is subjected to pre-firing, the carbonaceous material of the present invention can be obtained by carbonizing the carbon precursor at 900° C. to 1600° C. in a non-oxidizing gas atmosphere.

Production of Carbonaceous Material from Resin

Examples of the production method for the carbonaceous material from a resin will be described below.

The carbonaceous material of the present invention can also be obtained by carbonizing the material at 900° C. to 1600° C. using a resin as a precursor. Phenol resins, furan resins, or thermosetting resins in which the functional groups of these resins are partially modified may be used as resins. The carbonaceous material can also be obtained by subjecting a thermosetting resin to pre-firing at a temperature of lower than 900° C. as necessary and then pulverizing and carbonizing the resin at 900° C. to 1600° C. Oxidation treatment may also be performed as necessary at a temperature of 120 to 400° C. for the purpose of accelerating the curing of the thermosetting resin, increasing the degree of crosslinking, or improving the carbonization yield. Here, an oxidizing gas such as $O_2$, $O_3$, $NO_2$, a mixed gas in which these are diluted with air, nitrogen, or the like, or air, or an oxidizing liquid such as sulfuric acid, nitric acid, or hydrogen peroxide water can be used as an oxidizer.

Furthermore, it is also possible to use a carbon precursor prepared by crosslinking a thermoplastic resin such as polyacrylonitrile or a styrene/divinyl benzene copolymer. These resins can be obtained, for example, by adding a monomer mixture prepared by mixing a radical polymerizable vinyl monomer and a polymerization initiator to an aqueous dispersion medium containing a dispersion stabilizer, suspending the mixture by mixing while stirring to transform the monomer mixture to fine liquid droplets, and then heating the droplets to promote radical polymerization. The resulting crosslinked structure can be developed by means of crosslinking treatment of the obtained resin to form a spherical carbon precursor. Crosslinking treatment can be performed in a temperature range of 120 to 400° C., particularly preferably in a range of 170 to 350° C., and even more preferably in a range of 220 to 350° C. Here, an oxidizing gas such as $O_2$, $O_3$, $SO_3$, $NO_2$, a mixed gas in which these are diluted with air, nitrogen, or the like, or air, or an oxidizing liquid such as sulfuric acid, nitric acid, or hydrogen peroxide water can be used as an oxidizer. The carbonaceous material of the present invention can be obtained by then subjecting the heat-infusible carbon precursor to pre-firing as necessary, as described above and then pulverizing and carbonizing the carbon precursor at 900° C. to 1600° C. in a non-oxidizing gas atmosphere.

The pulverization step may also be performed after carbonization, but when the carbonization reaction progresses, the carbon precursor becomes hard, which makes it difficult to control the particle size distribution by means of pulverization, so the pulverization step is preferably performed after pre-firing at a temperature of lower than 900° C. and prior to final firing.

[2] Non-Aqueous Electrolyte Secondary Battery Anode

The non-aqueous electrolyte secondary battery anode of the present invention comprises the carbonaceous material for a non-aqueous electrolyte secondary battery anode of the present invention.

In the anode of the present invention, the electrode density is preferably not less than 1.02 g/cm$^3$ and more preferably not less than 1.04 g/cm$^3$ from the perspective of further improving input/output characteristics.

In the anode of the present invention, the average thickness is preferably thin, specifically not greater than 60 μm, from the perspective of limiting the disadvantage of inhibiting movement of lithium, which can occur where there are insufficient voids between particles due to dense packing. On the other hand, when the average thickness is too thin, the maximum required particle size of the carbonaceous material is low, and there are concerns about pulverization conditions required to achieve it being impractical and the resulting increase in ultrafine powder. For this reason, the average thickness should be not less than 10 μm.

Production of Anode

The anode that uses the carbonaceous material of the present invention can be produced by adding a binder to the carbonaceous material, adding appropriate amount of suitable solvent, kneading to form an electrode mixture, subsequently, coating the electrode mixture on a collector formed from a metal plate or the like and drying, and then pressure-forming. An electrode having high conductivity can be produced by using the carbonaceous material of the present invention without particularly adding a conductivity agent, but a conductivity agent may be added as necessary when preparing the electrode mixture for the purpose of imparting even higher conductivity. As the conductivity agent, conductive carbon black, vapor-grown carbon fibers (VGCF), nanotubes, or the like can be used. The added amount of the conductivity agent differs depending on the type of the conductivity agent that is used, but when the added amount is too small, the expected conductivity cannot be achieved, which is not preferable. Conversely, when the added amount is too large, dispersion of the conductivity agent in the electrode mixture becomes poor, which is not preferable. From this perspective, the proportion of the added amount of the conductivity agent is preferably from 0.5 to 10% by mass (here, it is assumed that the amount of the active material (carbonaceous material)+the amount of the binder+the amount of the conductivity agent=100% by mass), more preferably from 0.5 to 7% by mass, and particularly preferably from 0.5 to 5% by mass. The binder is not particularly limited as long as the binder does not react with an electrolyte solution such as polyvinylidene fluoride (PVDF), polytetrafluoroethylene, and a mixture of styrene-butadiene rubber (SBR) and carboxymethyl cellulose (CMC). Of these, PVDF is preferable since the PVDF attached on the surface of an active material does not inhibit migration of lithium-ions and excellent input/output characteristics is achieved. In order to form a slurry by dissolving PVDF, a polar solvent such as N-methylpyrrolidone (NMP) can be preferably used; however, aqueous emulsion, such as SBR, or CMC can be also used by dissolving in water. When the added amount of the binder is too large, since the resistance of the resulting electrode becomes large, the internal resistance of the battery becomes large. This diminishes the battery characteristics, which is not preferable. When the added amount of the binder is too small, the bonds between the anode material particles, and the bonds between the anode material particles and the current collector become insufficient, which is not preferable. Preferable amount of the binder that is added differs depending on the type of the binder that is used; however, the amount of binder is, when a PVDF-based binder is used, preferably from 3 to 13% by mass, and more preferably from 3 to 10% by mass. On the other hand, when using a binder that uses water as a solvent, a plurality of binders is often mixed for use (e.g. a mixture of SBR and CMC). The total amount of all the binders that are used is preferably from 0.5 to 5% by mass, and more preferably from 1 to 4% by mass. The electrode active material layer is typically formed on both sides of the current collector, but the layer may be formed on one side as necessary. The number of required current collectors or separators becomes smaller as the thickness of the electrode active material layer increases, which is preferable for increasing capacity. However, it is more advantageous from the perspective of improving the input/output characteristics for the electrode area of opposite electrodes to be wider, so when the active material layer is too thick, the input/output characteristics are diminished, which is not preferable.

Furthermore, the electrode density of the anode may be controlled by adjusting press pressure. Since the anode of the present invention preferably has a high electrode density, press pressure should typically be not lower than 5.2 MPa (1.0 tf/cm$^2$). On the other hand, when press pressure is too high, it is not preferable because flexure of the electrode is high. The press pressure is preferably not higher than 52.0 MPa (10.0 tf/cm$^2$), and more preferably not higher than 41.6 MPa (8.0 tf/cm$^2$).

[3] Non-Aqueous Electrolyte Secondary Battery

The non-aqueous electrolyte secondary battery of the present invention comprises the non-aqueous electrolyte secondary battery anode of the present invention.

Production of Non-Aqueous Electrolyte Secondary Battery

When an anode for a non-aqueous electrolyte secondary battery is formed using the anode material of the present invention, the other materials constituting the battery such as a cathode material, a separator, and an electrolyte solution are not particularly limited, and various materials that have been conventionally used or proposed for non-aqueous solvent secondary batteries can be used.

For example, layered oxide-based (as represented by LiMO$_2$, where M is a metal such as LiCoO$_2$, LiNiO$_2$, LiMnO$_2$, or LiNi$_x$Co$_y$Mo$_z$O$_2$ (where x, y, and z represent composition ratios)), olivine-based (as represented by LiMPO$_4$, where M is a metal, such as LiFePO$_4$), and spinel-based (as represented by LiM$_2$O$_4$, where M is a metal, such as LiMn$_2$O$_4$) complex metal chalcogen compounds are preferable as cathode materials, and these chalcogen compounds may be mixed as necessary. A cathode is formed by coating these cathode materials with an appropriate binder together with a carbon material for imparting conductivity to the electrode and forming a layer on a conductive current collector.

A non-aqueous electrolyte solution used with this cathode and anode combination is typically formed by dissolving an electrolyte in a non-aqueous solvent. As the non-aqueous solvent, for example, one type or a combination of two or more types of organic solvents, such as propylene carbonate, ethylene carbonate, dimethyl carbonate, diethyl carbonate, dimethoxy ethane, diethoxy ethane, γ-butyl lactone, tetrahydrofuran, 2-methyltetrahydrofuran, sulfolane, or 1,3-dioxolane can be used. Furthermore, LiClO$_4$, LiPF$_6$, LiBF$_4$, LiCF$_3$SO$_3$, LiAsF$_6$, LiCl, LiBr, LiB(C$_6$H$_5$)$_4$, LiN(SO$_3$CF$_3$)$_2$ and the like can be used as an electrolyte. Secondary battery is typically formed by immersing, in an electrolyte solution, a cathode layer and an anode layer, which are produced as described above, that are arranged facing each other via, as necessary, a liquid permeable separator formed from nonwoven fabric and other porous materials. As a separator, a liquid permeable separator formed from nonwoven fabric and other porous materials that is typically used in secondary batteries can be used. Alternatively, in place of a separator or together with a separator, a solid electrolyte formed from polymer gel in which an electrolyte solution is impregnated can be also used.

The lithium-ion secondary battery of the present invention is suitable for a battery that is mounted on vehicles such as automobiles (typically, lithium-ion secondary battery for driving vehicle).

"Vehicle" in the present invention can be, without any particular limitations, a vehicle known as a typical electric vehicle, a hybrid vehicle of a fuel cell and an internal-combustion engine, or the like; however, the vehicle in the present invention is a vehicle that comprises at least: a power source device provided with the battery described above, a motor driving mechanism driven by the power supply from the power source device, and a control device that controls this. Further, the vehicle may also be equipped with a rheostatic brake or a regenerative brake, and a mechanism for charging the lithium ion secondary battery by converting energy generated by braking into electricity. This battery is useful in a hybrid vehicle particularly because the degree of freedom of battery capacity is low.

EXAMPLES

The present invention will be described in detail hereafter using working examples, but these working examples do not limit the scope of the present invention.

The measurement methods for the physical properties ($\rho_{Bt}$, BET specific surface area, number average particle size, volume average particle size ($D_{v50}$), cumulative volume particle size ($D_{v10}$) and ($D_{v90}$), atomic ratio (H/C) of hydrogen and carbon, $d_{002}$, charge capacity, discharge capacity, irreversible capacity, input characteristics, and electrode density) of the carbonaceous material for a non-aqueous electrolyte secondary battery anode of the present invention will be described hereinafter. The physical properties described in this specification, including those in the working examples, are based on values determined by the following methods.

True Density Determined by Pycnometer Method Using Butanol ($\rho_{Bt}$)

True density was measured using the pycnometer method using butanol in accordance with the method prescribed in JIS R 7212. The mass (m$_1$) of a pycnometer with a bypass line having an internal volume of approximately 40 mL was precisely measured. Next, after a sample was placed flat at the bottom of the pycnometer so as to have a thickness of approximately 10 mm, the mass ($m_2$) was precisely measured. Next, 1-butanol was slowly added to the pycnometer to a depth of approximately 20 mm from the bottom. Next, the pycnometer was gently oscillated, and after it was confirmed that no large air bubbles were formed, the pycnometer was placed in a vacuum desiccator and gradually evacuated to a pressure of 2.0 to 2.7 kPa. The pressure was maintained for 20 minutes or longer, and after the generation of air bubbles stopped, the bottle was removed and further filled with 1-butanol. After a stopper was inserted, the bottle was immersed in a constant-temperature water bath (adjusted to 30±0.03° C.) for at least 15 minutes, and the liquid surface of 1-butanol was aligned with the marked line. Next, the pycnometer was removed, and after the outside of the pycnometer was thoroughly wiped and the pycnometer was cooled to room temperature, the mass ($m_4$) was precisely measured.

Next, the same pycnometer was filled with 1-butanol alone and immersed in a constant-temperature water bath in the same manner as described above. After the marked line was aligned, the mass ($m_3$) was measured. In addition, distilled water which was boiled immediately before use and from which the dissolved gas was removed was collected in the pycnometer and immersed in a constant-temperature water bath in the same manner as described above. After the marked line was aligned, the mass ($m_5$) was measured. $\rho_{Bt}$ is calculated using the following formula.

$$\rho_{Bt} = \frac{m_2 - m_1}{m_2 - m_1 - (m_4 - m_3)} \times \frac{m_3 - m_1}{m_5 - m_1} d \quad \text{[Formula 1]}$$

Here, d is the specific gravity (0.9946) of water at 30° C.

Specific Surface Area (SSA) by Nitrogen Adsorption

An approximation derived from the BET formula is given below.

$$v_m = \frac{1}{\{v(1-x)\}} \quad \text{[Formula 2]}$$

A value $v_m$ was determined by a one-point method (relative pressure x=0.2) based on nitrogen adsorption at the temperature of liquid nitrogen using the above approximation, and the specific surface area of the sample was calculated from the following formula:

Specific surface area (SSA)=4.35×$V_m$ (m²/g)   [Formula 3]

Here, $v_m$ is the amount of adsorption (cm³/g) required to form a monomolecular layer on the sample surface; v is the amount of adsorption (cm³/g) that is actually measured; and x is the relative pressure.

Specifically, the amount of adsorption of nitrogen in the carbonaceous material at the temperature of liquid nitrogen was measured as follows using a "Flow Sorb II2300" manufactured by MICROMERITICS. A test tube was filled with carbonaceous material pulverized to an average particle size of approximately 1 to 7 µm, and the test tube was cooled to −196° C. while infusing a mixed gas of helium and nitrogen in a ratio of 80:20 so that the nitrogen was adsorbed in the carbonaceous material. Next, the test tube was returned to room temperature. The amount of nitrogen desorbed from the sample at this time was measured with a thermal conductivity detector and used as the adsorption gas amount v.

Hydrogen/Carbon Atomic Ratio (H/C)

The atomic ratio was measured in accordance with the method prescribed in JIS M8819. The ratio of the numbers of hydrogen/carbon atoms was determined from the mass ratio of hydrogen and carbon in a sample obtained by elemental analysis using a CHN analyzer.

Average Interlayer Spacing ($d_{002}$) by X-Ray Diffraction

A sample holder was filled with a carbonaceous material powder, and measurements were performed with a symmetrical reflection method using an X'Pert PRO manufactured by the PANalytical B.V. Under conditions with a scanning range of 8<2θ<50° and an applied current/applied voltage of 45 kV/40 mA, an X-ray diffraction pattern was obtained using CuKα rays (λ=1.5418 Å) monochromated by an Ni filter as a radiation source. The correction was performed by using the diffraction peak of the (111) surface of a high-purity silicon powder serving as a standard substance. The wavelength of the CuKα rays is set to 0.15418 nm, and $d_{002}$ is calculated by Bragg's equation.

$$d_{002} = \frac{\lambda}{2 \cdot \sin\theta} \text{ (Bragg's equation)} \quad \text{[Formula 4]}$$

λ: Wavelength of X-rays; θ: Diffraction angle

Volume average particle size ($D_{v50}$) and cumulative volume particle size ($D_{v10}$, $D_{v90}$) by laser diffraction Three drops of a dispersant (cationic surfactant, "SN-WET 366" (manufactured by San Nopco Limited)) were added to approximately 0.01 g of a sample, and the dispersant was blended into the sample. Next, after purified water was added and dispersed using ultrasonic waves, the particle size distribution in a particle size range of 0.02 to 2,000 µm was determined with a particle size distribution measurement device ("Microtrac MT3300EX" manufactured by Nikkiso Co., Ltd.). As the selected measurement conditions, the permeability was absorption, the particle index of refraction was 1.81, and the shape was non-spherical. The volume average particle size $D_{v50}$ was determined from the resulting particle size distribution as the particle size yielding a cumulative volume of 50% as a volume standard. Furthermore, the particle size yielding a cumulative volume of 90% was taken as $D_{v90}$, and the particle size yielding a cumulative volume of 10% was taken as $D_{v10}$.

Additionally, the quantity of particles of volume particle size not less than 30 µm was calculated by subtracting the measured cumulative value up to volume particle size 30 µm from 100.

Number Average Particle Size

The number average particle size was determined from the resulting particle size distribution as the particle size yielding a cumulative volume of 50% as a number standard by the same method as described above.

Doping/De-Doping Test of Active Material

Anodes and non-aqueous electrolyte secondary batteries were produced by performing the following operations (a) to (d) using the carbonaceous materials 1 to 10 obtained in Working Examples 1 to 10 and the comparative carbonaceous materials 1 to 4 obtained in Comparative Examples 1 to 4, and the electrode performance thereof was evaluated.

(a) Production of Electrode

NMP was added to 94 parts by mass of the carbonaceous material and 6 parts by mass of polyvinylidene fluoride (KF#9100, manufactured by Kureha Corporation) and formed into a paste and then applied uniformly to copper foil. After this was dried, the sample was punched from the copper foil into a disc shape with a diameter of 15 mm, and pressed with a pressure of 2.5 tf/cm² (13 MPa) to obtain an electrode. The amount of the carbonaceous material in the electrode was adjusted to approximately 9 mg.

Electrode Density

For the anode, a current collector having a thickness of t1 [cm] and a mass per unit area of W1 [g/cm²] was coated with a mixture of carbonaceous material and a binder in which the mass proportion of carbonaceous material was P, and an anode of thickness t2 [cm] produced by pressing was punched to a prescribed area S [cm²], and the mass of the anode after punching was taken as W2 [g]. At this time, electrode density was calculated as follows.

Electrode density[g/cm³]=(W2/S−W1)/(t2−t1)

Average Thickness

When an anode active material layer is present on both faces of the current collector of the anode, the thickness of the anode active material layer is equivalent to half the thickness obtained by subtracting the current collector thickness from that of the anode. Furthermore, when an anode active material layer is present on one face of the current collector of the anode, the thickness of the anode active material layer is equivalent to the thickness obtained by subtracting the current collector thickness from that of the anode electrode. Specifically, the thickness of the anode active material and the current collector were measured using a thickness gauge. They were measured in five locations, and the average thereof was taken as the average thickness.

(b) Production of Test Battery

Although the carbonaceous material of the present invention is suitable for forming an anode for a non-aqueous electrolyte secondary battery, in order to precisely evaluate the discharge capacity (de-doping capacity) and the irreversible capacity (non-de-doping capacity) of the battery active material without being affected by fluctuation in the performance of the counter electrode, a lithium secondary battery was formed using the electrode obtained above together with a counter electrode comprising lithium metal with stable characteristics, and the characteristics thereof were evaluated.

The lithium electrode was prepared inside a glove box in an Ar atmosphere. An electrode (counter electrode) was formed by spot-welding a stainless steel mesh disc with a diameter of 16 mm on the outer lid of a 2016 coin type test cell in advance, punching a thin sheet of metal lithium with a thickness of 0.8 mm into a disc shape with a diameter of 15 mm, and pressing the thin sheet of metal lithium into the stainless steel mesh disc.

A 2016 coin-type non-aqueous electrolyte lithium secondary battery was assembled in an Ar glove box using a pair of electrodes produced in this way, using a solution in which LiPF$_6$ was added at a proportion of 1.4 mol/L to a mixed solvent prepared by mixing ethylene carbonate, dimethyl carbonate, and methyl ethyl carbonate at a volume ratio of 1:2:2 as an electrolyte solution, using a fine porous membrane separator made of borosilicate glass fibers with a diameter of 19 mm as a separator, and using a polyethylene gasket.

(c) Measurement of Battery Capacity

Charge-discharge tests were performed at 25° C. on a lithium secondary battery with the configuration described above using a charge-discharge tester ("TOSCAT" manufactured by Toyo System Co., Ltd.). A lithium doping reaction for inserting lithium into the carbon electrode was performed with a constant-current/constant-voltage method, and a de-doping reaction was performed with a constant-current method. Here, in a battery using a lithium chalcogen compound for the cathode, the doping reaction for inserting lithium into the carbon electrode is called "charging", and in a battery using lithium metal for a counter electrode, as in the test battery of the present invention, the doping reaction for the carbon electrode is called "discharging". The manner in which the doping reactions for inserting lithium into the same carbon electrode thus differs depending on the pair of electrodes used. Therefore, the doping reaction for inserting lithium into the carbon electrode will be described as "charging" hereafter for the sake of convenience. Conversely, "discharging" refers to a charging reaction in the test battery but is described as "discharging" for the sake of convenience since it is a de-doping reaction for removing lithium from the carbonaceous material. The charging method used here is a constant-current/constant-voltage method. Specifically, constant-current charging was performed at 0.5 mA/cm² until the terminal voltage reached 0.050 V. After the terminal voltage reached 0.050 V, constant-voltage charging was performed at a terminal voltage of 0.050 V, and charging was continued until the current value reached 20 μA. At this time, a value determined by dividing the amount of electricity supplied by the mass of the carbonaceous material of the electrode is defined as the charge capacity per unit mass of the carbonaceous material (mAh/g). After the completion of charging, the battery circuit was opened for 30 minutes, and discharging was performed thereafter. Discharging was performed at a constant current of 0.5 mA/cm² until the final voltage reached 1.5 V. At this time, a value determined by dividing the amount of electricity discharged by the mass of the carbonaceous material of the electrode is defined as the discharge capacity per unit mass of the carbonaceous material (mAh/g). Capacity per unit volume is calculated by multiplying the above electrode density by this capacity per unit mass. The irreversible capacity was calculated as the discharge capacity subtracted from the charge capacity. The charge/discharge capacity and irreversible capacity were determined by averaging three measurements (n=3) for test batteries produced using the same sample. Additionally, the value obtained by dividing the discharge capacity by the charge capacity was multiplied by 100 to determine initial efficiency (%). This is a value that indicates how efficiently the active material is used.

(d) Input Characteristics in 50% Charged State

An anode was produced by the same procedure as (a) above. Furthermore, the amount of carbonaceous material in the electrode was adjusted so as to result in a prescribed electrode thickness after pressing. For the cathode, NMP was added to 94 parts by mass of lithium cobaltate (LiCoO$_2$), 3 parts by mass of carbon black, and 3 parts by mass of polyvinylidene fluoride (KF#1300, manufactured by Kureha Corporation) and formed into a paste and then applied uniformly to aluminum foil. After this was dried, a coated electrode was punched from the aluminum foil into a disc shape with a diameter of 14 mm, and pressed to obtain an electrode. Furthermore, the amount of lithium cobaltate in the cathode was adjusted such that the charge capacity of the anode active material was 95%. It was calculated assuming the capacity of lithium cobaltate is 150 mAh/g.

A 2032 coin-type non-aqueous electrolyte lithium secondary battery was assembled in an Ar glove box using a pair of electrodes prepared in this way, using a solution in which LiPF$_6$ was added at a proportion of 1.4 mol/liter to a mixed solvent prepared by mixing ethylene carbonate, dimethyl carbonate, and methyl ethyl carbonate at a volume ratio of 1:2:2 as an electrolyte solution, using a fine porous membrane separator made of borosilicate glass fibers with a diameter of 19 mm as a separator, and using a polyethylene gasket.

First, aging was performed by repeating charging and discharging twice at 25° C., and then an input/output test was begun. The constant-current/constant-voltage conditions used in aging were, during the first aging, charging with a current value of C/5 until the battery voltage reached 4.2 V, and then continuously varying the current value (while maintaining a constant voltage) so as to maintain the voltage at 4.2 V, and continuing to charge until the current value reached C/100. After the completion of charging, the battery circuit was opened for 10 minutes, and discharging was performed thereafter. Discharging was performed with a current value of C/5 until the battery voltage reached 2.75 V. The second aging was performed in the same manner as the first aging except that the current value was set to 2C/5. The discharge capacity in the second aging at 2/5C was taken as the initial capacity. The battery was charged to a charge depth of 50% relative to the initial capacity, and the test environment after charging was set to −20° C., and after sufficient holding time, discharging and charging were alternated for 10 seconds in order at 0.5C, 1C, and 2C. The current value when the upper limit voltage was set to 4.2 V was extrapolated from the relationship between voltage and current on 1 second during discharging and charging at each current value, and the input value was calculated from the obtained upper limit voltage and current value. This input value was divided by the volume of the cathode and the anode to calculate input density. The −20° C. input density ratio was calculated from the ratio with the input density obtained by the above −20° C. input/output test.

The characteristics of the obtained lithium secondary batteries are shown in Tables 1 and 2.

Working Example 1

First, 70 kg of a petroleum pitch with a softening point of 205° C. and an H/C atomic ratio of 0.65 and 30 kg of naphthalene were charged into a pressure-resistant container with an internal volume of 300 liters and having a stirring blade and an outlet nozzle, and after the substances were melted and mixed while heating at 190° C., the mixture was cooled to 80 to 90° C. The inside of the pressure-resistant container was pressurized by nitrogen gas, and the content was extruded from the outlet nozzle to obtain a string-shaped compact with a diameter of approximately 500 µm. Next, this string-shaped compact was pulverized so that the ratio (L/D) of the diameter (D) and the length (L) was approximately 1.5, and the resulting pulverized product was added to an aqueous solution in which 0.53% by mass of polyvinyl alcohol (degree of saponification: 88%) heated to 93° C. is dissolved, dispersed while stirring, and cooled to obtain a spherical pitch compact slurry. After the majority of the water was removed by filtration, the naphthalene in the pitch compact was extracted with n-hexane in a quantity of 6 times the mass of the spherical pitch compact. Using a fluidized bed, the porous spherical pitch obtained in this manner was heated to 240° C. and held for 1 hour at 240° C. while hot air was passed through to oxidize, thereby producing heat-infusible porous spherical oxidized pitch.

Then, 7 kg of the porous spherical oxidized pitch was placed in a vertical tube furnace 130 mm in diameter, and heated to 600° C. at a heating rate of 100° C./h under nitrogen gas flow. It was held at 600° C. for 1 hour to perform pre-firing, and a carbon precursor was obtained. The obtained carbon precursor was pulverized with a steam jet mill (Toyo Hitec Co., Ltd.), to produce a powdered carbon precursor having a number average particle size of 0.73 µm and a volume average particle size of 6.9 µm. Next, 10 g of this powdered carbon precursor was placed in a horizontal tubular furnace with a diameter of 100 mm and heated to 1,200° C. at a heating rate of 250° C./h. This was held for 1 hour at 1,200° C. and subjected to final firing to prepare a carbonaceous material 1. Final firing was performed in a nitrogen atmosphere with a flow rate of 10 L/min.

Working Example 2

Carbonaceous material 2 was obtained in the same manner as in Working Example 1 with the exception that the powdered carbon precursor had a number average particle size of 0.68 µm and a volume average particle size of 4.9 µm.

Working Example 3

Carbonaceous material 3 was obtained in the same manner as in Working Example 1 with the exception that the powdered carbon precursor had a number average particle size of 0.59 µm and a volume average particle size of 2.8 µm.

Working Example 4

Carbon precursor 4 was obtained in the same manner as in Working Example 1 with the exception that the oxidation temperature of the porous spherical pitch was changed to 270° C., and fine powder that was pulverized with a counter jet mill (100-AFG, manufactured by Hosokawa Micron Corporation) at a rotational frequency of 20,000 rpm and recovered with a bag filter was mixed, to yield a powdered carbon precursor having a number average particle size of 0.62 µm and a volume average particle size of 3.8 µm.

Working Example 5

Carbonaceous material 5 was obtained in the same manner as in Working Example 4 with the exception that the oxidation temperature of the porous spherical pitch was changed to 240° C., and the powdered carbon precursor had a number average particle size of 0.67 µm and a volume average particle size of 3.8 µm.

Working Example 6

Carbonaceous material 6 was obtained in the same manner as in Working Example 4 with the exception that the oxidation temperature of the porous spherical pitch was changed to 205° C., and the powdered carbon precursor had a number average particle size of 0.62 µm and a volume average particle size of 3.7 µm.

Working Example 7

Using a fluidized bed, porous spherical pitch obtained by the same method as in Working Example 1 was heated to 190° C. and held for 1 hour at 190° C. while hot air was passed through to oxidize, thereby producing porous spherical oxidized pitch that had undergone crosslinking treatment. 200 g of the obtained porous spherical oxidized pitch was placed in a horizontal tube furnace 150 mm in diameter, and heated to 600° C. at a heating rate of 150° C./h. It was held at 600° C. for 1 hour to perform pre-firing, and a carbon precursor was obtained. After the obtained carbon precursor was coarsely pulverized to a diameter of not greater than 2 mm, it was pulverized with a counter jet mill (100-AFG, manufactured by Hosokawa Micron Corporation), and fine powder recovered with a bag filter was mixed, to yield a powdered carbon precursor having a number average particle size of 0.55 μm and a volume average particle size of 3.2 μm. Next, 10 g of this powdered carbon precursor was placed in a horizontal tubular furnace with a diameter of 100 mm and heated to 1,200° C. at a heating rate of 250° C./h. This was held for 1 hour at 1,200° C. and subjected to final firing to prepare a carbonaceous material 7. Final firing was performed in a nitrogen atmosphere with a flow rate of 10 L/min.

Working Example 8

Carbonaceous material 8 was obtained in the same manner as in Working Example 7 with the exception that the oxidation time of the porous spherical pitch was changed to 7 minutes, and the powdered carbon precursor had a number average particle size of 0.53 μm and a volume average particle size of 3.1 μm.

Working Example 9

Carbonaceous material 9 was obtained in the same manner as in Working Example 6 with the exception that a powdered carbon precursor having a number average particle size of 0.53 μm and a volume average particle size of 4.6 μm was used.

Working Example 10

Coal pitch having a softening point of 188° C. and an H/C atomic ratio of 0.51 was pulverized at a rotational frequency of 13,000 rpm with a counter jet mill (100-AFG, manufactured by Hosokawa Micron Corporation), to produce powdered pitch with an average particle size of 5.2 μm. Then, this powdered pitch was placed in a muffle furnace (Denken Co., Ltd.), and held for 1 hour at 280° C. while passing through air at a rate of 20 L/min to perform infusibilization treatment, and infusibilized pitch was obtained. 100 g of the obtained infusibilized pitch was placed in a crucible, and in a vertical tube furnace it was heated to 600° C. at a heating rate of 50° C./h. It was held at 600° C. for 1 hour to perform pre-firing, and a carbon precursor was obtained. Pre-firing was performed in a nitrogen atmosphere with a flow rate of 5 L/min with the crucible in an open state. The obtained carbon precursor was pulverized with a sample mill, to produce a powdered carbon precursor with an average particle size of 4.6 μm. Next, 10 g of the powdered carbon precursor was placed in a horizontal tubular furnace with a diameter of 100 mm and heated to 1,200° C. at a heating rate of 250° C./h. This was held for 1 hour at 1,200° C. and subjected to final firing to prepare a carbonaceous material 10. Final firing was performed in a nitrogen atmosphere with a flow rate of 10 L/min.

Comparative Example 1

Comparative carbonaceous material 1 was obtained in the same manner as in Working Example 4 with the exception that, by pulverizing the precursor after pre-firing using a ball mill and performing fine powder classification, a powdered carbon precursor having a number average particle size of 2.9 μm and a volume average particle size of 10.5 μm was prepared and used.

Comparative Example 2

Comparative carbonaceous material 2 was obtained in the same manner as in Working Example 4 with the exception that, by pulverizing the precursor after pre-firing using a counter jet mill (100-AFG, Hosokawa Micron Corporation) and performing fine powder classification, a powdered carbon precursor having a number average particle size of 2.7 μm and a volume average particle size of 6.5 μm was prepared and used.

Comparative Example 3

Comparative carbonaceous material 3 was obtained in the same manner as in Working Example 2 with the exception that the powdered carbon precursor of Working Example 2 having a number average particle size of 0.44 μm and a volume average particle size of 0.80 μm recovered with a bag filter was prepared and used.

Comparative Example 4

Comparative carbonaceous material 4 was obtained in the same manner as in Working Example 2 with the exception that the firing temperature was changed to 800° C.

The results of measuring and evaluating the characteristics of the carbonaceous materials obtained in the working examples and comparative examples and the performance of the electrodes and batteries produced using them are shown in Tables 1 and 2. Furthermore, Table 3 shows the results of measuring input density while varying the average thickness of the anode using the carbonaceous material of Working Example 5.

The carbonaceous materials of Working Examples 1 to 10 were made up of small particles with a number average particle size in the range of 0.1 to 2.0 μm and had a broad particle size distribution in which the value of number average particle size/volume average particle size was not greater than 0.3. As a result, charging characteristics improved and high discharge capacity per unit volume was obtained. This is also demonstrated by the fact that electrode density of an electrode pressed under the same press conditions was high. Furthermore, input density in a low-temperature environment also improved.

In contrast, the carbonaceous materials of Comparative Examples 1 to 3 did not satisfy the ranges of number average particle size and number average particle size/volume average particle size of the present invention, and the carbonaceous material of Comparative Example 4 did not satisfy the range of H/C ratio of the present invention. For this reason, electrode density was lower than in the working examples. Furthermore, discharge capacity per unit volume was also lower than in the working examples, and initial efficiency or input density in a low-temperature environment tended to be inferior to those of the working examples. In this manner, the working examples satisfying the ranges of the present invention have good input/output characteristics.

TABLE 1

| | Particle size | | | | | | | | | | | |
|---|---|---|---|---|---|---|---|---|---|---|---|---|
| | $D_{v10}$ [μm] | $D_{v50}$ [μm] | $D_{v90}$ [μm] | $(D_{v90} - D_{v10})/D_{v50}$ | Number average particle size [μm] | Number average particle size/$D_{v50}$ | Quantity of particles not less than 30 μm [vol %] | $\rho_{Bt}$ [g/cm³] | SSA [m²/g] | $d_{002}$ [nm] | H/C | Anode thickness [μm] | Electrode density [g/cm³] |
| Working Example 1 | 1.2 | 6.5 | 12.5 | 1.7 | 0.7 | 0.1 | 0 | 1.56 | 6.8 | 0.381 | 0.02 | 54 | 1.08 |
| Working Example 2 | 1.2 | 4.5 | 9.3 | 1.8 | 0.7 | 0.2 | 0 | 1.56 | 10.5 | 0.380 | 0.02 | 54 | 1.09 |
| Working Example 3 | 0.6 | 2.5 | 4.5 | 1.6 | 0.6 | 0.2 | 0 | 1.56 | 17.4 | 0.380 | 0.02 | 53 | 1.08 |
| Working Example 4 | 1.1 | 4.5 | 9.1 | 1.8 | 0.7 | 0.2 | 0 | 1.52 | 9.5 | 0.383 | 0.03 | 53 | 1.06 |
| Working Example 5 | 1.1 | 3.5 | 6.6 | 1.6 | 0.7 | 0.2 | 0 | 1.56 | 14.6 | 0.381 | 0.02 | 54 | 1.04 |
| Working Example 6 | 1.1 | 3.5 | 7.5 | 1.8 | 0.6 | 0.2 | 0 | 1.63 | 10.7 | 0.374 | 0.02 | 52 | 1.09 |
| Working Example 7 | 0.7 | 3.1 | 5.5 | 1.5 | 0.5 | 0.2 | 0 | 1.74 | 15.3 | 0.370 | 0.02 | 46 | 1.19 |
| Working Example 8 | 0.6 | 3.0 | 5.3 | 1.6 | 0.5 | 0.2 | 0 | 1.92 | 15.6 | 0.360 | 0.02 | 40 | 1.25 |
| Working Example 9 | 1.8 | 4.5 | 10.0 | 1.8 | 0.5 | 0.1 | 0 | 1.63 | 18.2 | 0.374 | 0.02 | 51 | 1.10 |
| Working Example 10 | 1.1 | 4.5 | 9.2 | 1.8 | 0.6 | 0.1 | 0 | 1.62 | 10.3 | 0.375 | 0.03 | 52 | 1.09 |
| Comparative Example 1 | 3.8 | 9.8 | 17.0 | 1.3 | 2.8 | 0.3 | 1 | 1.52 | 5.2 | 0.383 | 0.02 | 56 | 1.01 |
| Comparative Example 2 | 2.8 | 5.0 | 8.2 | 1.1 | 2.6 | 0.5 | 0 | 1.52 | 7.3 | 0.383 | 0.02 | 55 | 0.98 |
| Comparative Example 3 | 0.4 | 0.8 | 2.3 | 2.5 | 0.4 | 0.5 | 0 | 1.54 | 54.8 | 0.382 | 0.03 | 54 | 1.00 |
| Comparative Example 4 | 1.1 | 4.5 | 9.1 | 1.8 | 0.7 | 0.1 | 0 | 1.49 | 61.5 | 0.380 | 0.12 | 56 | 0.98 |

TABLE 2

| | Charge capacity [mAh/cm³] | Discharge capacity [mAh/cm³] | Irreversible capacity [mAh/cm³] | Initial efficiency [%] | −20° C. input density ratio [%] |
|---|---|---|---|---|---|
| Working Example 1 | 255 | 211 | 44 | 82.5 | 110 |
| Working Example 2 | 263 | 212 | 51 | 80.6 | 122 |
| Working Example 3 | 268 | 211 | 57 | 78.6 | 162 |
| Working Example 4 | 263 | 207 | 56 | 78.5 | 139 |
| Working Example 5 | 265 | 206 | 59 | 77.7 | 138 |
| Working Example 6 | 281 | 231 | 50 | 82.4 | 124 |
| Working Example 7 | 316 | 259 | 57 | 82.2 | 164 |
| Working Example 8 | 342 | 281 | 61 | 82.0 | 176 |
| Working Example 9 | 269 | 215 | 54 | 79.8 | 114 |
| Working Example 10 | 268 | 207 | 61 | 77.2 | 120 |
| Comparative Example 1 | 249 | 196 | 54 | 78.5 | 100 |
| Comparative Example 2 | 248 | 189 | 59 | 76.2 | 119 |
| Comparative Example 3 | 291 | 198 | 93 | 68.0 | — |
| Comparative Example 4 | 342 | 212 | 130 | 62.1 | — |

TABLE 3

| | Anode thickness [μm] | −20° C. input density ratio [%] |
|---|---|---|
| Working Example 5 | 41.3 | 141 |
| Working Example 5a | 62.0 | 107 |
| Working Example 5b | 97.7 | 100 |

The invention claimed is:

1. A carbonaceous material for a non-aqueous electrolyte secondary battery anode, wherein the carbonaceous material comprises the following:
   a number average particle size being from 0.1 to 2.0 μm, a value of a number average particle size divided by a volume average particle size being not greater than 0.3, an average interlayer spacing $d_{002}$ of an (002) plane determined by X-ray diffraction being from 0.340 to 0.390 nm, and an atomic ratio (H/C) of hydrogen and carbon being not greater than 0.10.

2. The carbonaceous material for a non-aqueous electrolyte secondary battery anode according to claim 1, wherein a volume average particle size $D_{v50}$ is from 1 to 7 μm.

3. The carbonaceous material for a non-aqueous electrolyte secondary battery anode according to claim 1, wherein a cumulative volume particle size $D_{v10}$ is not greater than 2.5 μm.

4. The carbonaceous material for a non-aqueous electrolyte secondary battery anode according to claim 1, wherein a quantity of particles having a volume average particle size of not less than 30 μm is not greater than 1.0 vol %.

5. A non-aqueous electrolyte secondary battery anode comprising the carbonaceous material for a non-aqueous electrolyte secondary battery anode described in claim 1.

6. The non-aqueous electrolyte secondary battery anode according to claim 5, wherein an electrode density when press pressure of 13 MPa (2.5 tf/cm$^2$) is applied is not less than 1.02 g/cm$^3$.

7. The non-aqueous electrolyte secondary battery anode according to claim 5, wherein an average thickness is not greater than 60 μm.

8. A non-aqueous electrolyte secondary battery comprising the non-aqueous electrolyte secondary battery anode described in claim 5.

9. A vehicle in which the non-aqueous electrolyte secondary battery described in claim 8 is mounted.

* * * * *